United States Patent
Isaacson et al.

(10) Patent No.: US 8,074,214 B2
(45) Date of Patent: Dec. 6, 2011

(54) SYSTEM FOR CREATING A CUSTOMIZED SOFTWARE INSTALLATION ON DEMAND

(75) Inventors: Scott A. Isaacson, Woodland Hills, UT (US); Eric W. B. Anderson, Alpine, UT (US); Robert Wipfel, Draper, UT (US)

(73) Assignee: Oracle International Corporation, Redwood City, CA (US)

( * ) Notice: Subject to any disclaimer, the term of this patent is extended or adjusted under 35 U.S.C. 154(b) by 1055 days.

(21) Appl. No.: 11/134,541

(22) Filed: May 19, 2005

(65) Prior Publication Data

US 2006/0265706 A1    Nov. 23, 2006

(51) Int. Cl.
    G06F 9/44     (2006.01)
    G06F 9/445    (2006.01)

(52) U.S. Cl. .................................. 717/173; 717/178

(58) Field of Classification Search ................... None
    See application file for complete search history.

(56) References Cited

U.S. PATENT DOCUMENTS

| | | | |
|---|---|---|---|
| 4,918,653 A | 4/1990 | Johri et al. | |
| 5,664,206 A | 9/1997 | Murow et al. | |
| 5,713,024 A * | 1/1998 | Halladay | 717/168 |
| 5,721,824 A * | 2/1998 | Taylor | 709/203 |
| 5,732,212 A * | 3/1998 | Perholtz et al. | 709/224 |
| 5,748,890 A | 5/1998 | Goldberg et al. | |
| 5,835,777 A * | 11/1998 | Staelin | 717/175 |
| 5,894,571 A * | 4/1999 | O'Connor | 713/2 |
| 5,901,227 A | 5/1999 | Perlman | |
| 5,950,010 A * | 9/1999 | Hesse et al. | 717/178 |
| 5,961,593 A | 10/1999 | Gabber et al. | |
| 6,144,959 A | 11/2000 | Anderson et al. | |
| 6,161,139 A | 12/2000 | Win et al. | |
| 6,205,579 B1 | 3/2001 | Southgate | |
| 6,256,774 B1 | 7/2001 | O'Leary et al. | |
| 6,259,442 B1 | 7/2001 | Britt et al. | |
| 6,282,711 B1 * | 8/2001 | Halpern et al. | 717/175 |
| 6,301,707 B1 | 10/2001 | Carroll et al. | |
| 6,324,691 B1 | 11/2001 | Gazdik | |

(Continued)

FOREIGN PATENT DOCUMENTS

GB    2419711    5/2006

OTHER PUBLICATIONS

YourDictionary.com, Remote boot, [retrieved on Jan. 5, 2010]. Retrieved from the Internet: <URL: http://www.yourdictionary.com/computer/remote-boot>.*

(Continued)

*Primary Examiner* — Tuan Dam
*Assistant Examiner* — Hanh T Bui
(74) *Attorney, Agent, or Firm* — Marger Johnson & McCollom PC

(57) ABSTRACT

A customized installation, e.g. of Linux software, is created by allowing a user to select packages that the user is interested in installing. During the process, the user is informed if two of the packages that were selected will not be interoperable at run-time. The user is then given an opportunity to resolve the conflict. The user is also informed if selected packages depend on other packages that were not selected in order to run properly, and given the opportunity to include those needed packages in the installation. Once the selected packages have been validated that they will interoperate and all dependencies are satisfied, the system can install the installation.

23 Claims, 11 Drawing Sheets

U.S. PATENT DOCUMENTS

| | | | |
|---|---|---|---|
| 6,353,926 B1* | 3/2002 | Parthesarathy et al. | 717/170 |
| 6,367,075 B1 | 4/2002 | Kruger et al. | |
| 6,421,777 B1* | 7/2002 | Pierre-Louis et al. | 713/2 |
| 6,457,130 B2 | 9/2002 | Hitz et al. | |
| 6,460,060 B1 | 10/2002 | Maddalozzo et al. | |
| 6,493,871 B1 | 12/2002 | McGuire et al. | |
| 6,539,473 B1 | 3/2003 | Hubacher et al. | |
| 6,539,539 B1 | 3/2003 | Larsen et al. | |
| 6,606,744 B1 | 8/2003 | Mikurak | |
| 6,615,406 B1* | 9/2003 | Amberg et al. | 717/177 |
| 6,651,085 B1 | 11/2003 | Woods | |
| 6,725,452 B1 | 4/2004 | Te'eni et al. | |
| 6,728,711 B2* | 4/2004 | Richard | 1/1 |
| 6,735,757 B1* | 5/2004 | Kroening et al. | 717/120 |
| 6,775,829 B1 | 8/2004 | Kroening | |
| 6,799,208 B1 | 9/2004 | Sankaranarayan et al. | |
| 6,892,382 B1 | 5/2005 | Hapner et al. | |
| 6,928,644 B1* | 8/2005 | Kroening et al. | 717/175 |
| 6,981,028 B1 | 12/2005 | Rawat et al. | |
| 7,006,993 B1 | 2/2006 | Cheong et al. | |
| 7,013,461 B2 | 3/2006 | Hellerstein et al. | |
| 7,016,959 B2 | 3/2006 | Dinh et al. | |
| 7,051,327 B1* | 5/2006 | Milius et al. | 717/177 |
| 7,055,149 B2 | 5/2006 | Birkholz et al. | |
| 7,093,247 B2 | 8/2006 | Ashworth et al. | |
| 7,143,067 B1* | 11/2006 | Cheston et al. | 705/59 |
| 7,177,859 B2* | 2/2007 | Pather et al. | 1/1 |
| 7,181,768 B1 | 2/2007 | Ghosh et al. | |
| 7,185,047 B1 | 2/2007 | Bate et al. | |
| 7,222,218 B2 | 5/2007 | Dutt et al. | |
| 7,251,812 B1* | 7/2007 | Jhanwar et al. | 717/171 |
| 7,272,815 B1 | 9/2007 | Eldridge et al. | |
| 7,284,243 B2 | 10/2007 | Burgess | |
| 7,302,634 B2 | 11/2007 | Lucovsky et al. | |
| 7,350,075 B1 | 3/2008 | Eastham | |
| 7,353,533 B2 | 4/2008 | Wright et al. | |
| 7,356,679 B1 | 4/2008 | Le et al. | |
| 7,398,480 B2* | 7/2008 | Zimniewicz et al. | 715/841 |
| 7,398,524 B2 | 7/2008 | Shapiro | |
| 7,424,617 B2 | 9/2008 | Boyd et al. | |
| 7,478,381 B2 | 1/2009 | Roberts et al. | |
| 7,506,337 B2* | 3/2009 | Iyer | 717/177 |
| 7,506,338 B2 | 3/2009 | Alpern et al. | |
| 7,539,978 B1 | 5/2009 | Haddox et al. | |
| 7,546,594 B2 | 6/2009 | McGuire et al. | |
| 7,571,427 B2 | 8/2009 | Wang et al. | |
| 7,574,706 B2 | 8/2009 | Meulemans et al. | |
| 7,577,722 B1 | 8/2009 | Khandekar et al. | |
| 7,853,609 B2* | 12/2010 | Dehghan et al. | 707/778 |
| 2001/0023440 A1 | 9/2001 | Franklin et al. | |
| 2001/0029605 A1* | 10/2001 | Forbes et al. | 717/11 |
| 2002/0007330 A1 | 1/2002 | Kumar et al. | |
| 2002/0007380 A1 | 1/2002 | Bauchot et al. | |
| 2002/0010757 A1 | 1/2002 | Granik et al. | |
| 2002/0019879 A1 | 2/2002 | Jasen et al. | |
| 2002/0100036 A1* | 7/2002 | Moshir et al. | 717/173 |
| 2002/0147974 A1* | 10/2002 | Wookey | 717/176 |
| 2002/0156877 A1 | 10/2002 | Lu et al. | |
| 2002/0162030 A1 | 10/2002 | Brezak et al. | |
| 2003/0014656 A1 | 1/2003 | Ault et al. | |
| 2003/0037107 A1 | 2/2003 | Maeda | |
| 2003/0061202 A1 | 3/2003 | Coleman | |
| 2003/0115292 A1 | 6/2003 | Griffin et al. | |
| 2003/0121024 A1 | 6/2003 | Hill et al. | |
| 2003/0126214 A1* | 7/2003 | Oliszewski | 709/206 |
| 2003/0131073 A1 | 7/2003 | Lucovsky et al. | |
| 2003/0149749 A1 | 8/2003 | Hetherington et al. | |
| 2003/0172127 A1 | 9/2003 | Northrup et al. | |
| 2003/0182414 A1* | 9/2003 | O'Neill | 709/223 |
| 2003/0195970 A1 | 10/2003 | Dinh et al. | |
| 2003/0200149 A1* | 10/2003 | Gonzalez et al. | 705/26 |
| 2003/0217123 A1* | 11/2003 | Anderson et al. | 709/219 |
| 2003/0221190 A1* | 11/2003 | Deshpande et al. | 717/171 |
| 2004/0003266 A1* | 1/2004 | Moshir et al. | 713/191 |
| 2004/0006710 A1 | 1/2004 | Pollutro et al. | |
| 2004/0015831 A1 | 1/2004 | Bowhill | |
| 2004/0015946 A1 | 1/2004 | Te'eni et al. | |
| 2004/0025048 A1 | 2/2004 | Porcari et al. | |
| 2004/0049697 A1 | 3/2004 | Edwards, Jr. et al. | |
| 2004/0102182 A1 | 5/2004 | Reith et al. | |
| 2004/0196981 A1 | 10/2004 | Nakano et al. | |
| 2004/0205748 A1* | 10/2004 | Iyer | 717/174 |
| 2004/0254976 A1 | 12/2004 | Malik et al. | |
| 2004/0255291 A1* | 12/2004 | Sierer et al. | 717/174 |
| 2005/0002057 A1 | 1/2005 | Oe | |
| 2005/0005152 A1* | 1/2005 | Singh et al. | 713/200 |
| 2005/0081055 A1 | 4/2005 | Patrick et al. | |
| 2005/0097353 A1 | 5/2005 | Patrick et al. | |
| 2005/0120054 A1 | 6/2005 | Shulman et al. | |
| 2005/0125677 A1 | 6/2005 | Michaelides | |
| 2005/0132179 A1* | 6/2005 | Glaum et al. | 713/1 |
| 2005/0132349 A1* | 6/2005 | Roberts et al. | 717/168 |
| 2005/0134896 A1 | 6/2005 | Koga | |
| 2005/0144615 A1 | 6/2005 | Chen et al. | |
| 2005/0246588 A1 | 11/2005 | Deng et al. | |
| 2006/0021065 A1 | 1/2006 | Kamperman et al. | |
| 2006/0047657 A1 | 3/2006 | Frieder et al. | |
| 2006/0059359 A1 | 3/2006 | Reasor et al. | |
| 2006/0090208 A1 | 4/2006 | Smith | |
| 2006/0123101 A1 | 6/2006 | Buccella et al. | |
| 2006/0123414 A1* | 6/2006 | Fors et al. | 717/177 |
| 2006/0137000 A1 | 6/2006 | Isaacson | |
| 2006/0155838 A1* | 7/2006 | Wu et al. | 709/223 |
| 2006/0218544 A1 | 9/2006 | Chakraborty et al. | |
| 2006/0230124 A1 | 10/2006 | Belfiore et al. | |
| 2006/0265597 A1 | 11/2006 | Carey et al. | |
| 2006/0277542 A1* | 12/2006 | Wipfel | 717/174 |
| 2007/0006205 A1 | 1/2007 | Kennedy et al. | |
| 2007/0111726 A1 | 5/2007 | Lambert et al. | |

OTHER PUBLICATIONS

"Firefox Help: How to Manage Profiles"; http://www.mozilla.org/support/firefox/profile; printed on Aug. 27, 2007; pp. 1-4.

"XenFaq—Xen Wiki"; http://www.wiki.xensource.com/xenwiki/XenFaq; printed on Aug. 27, 2007; pp. 1-7.

Buytaert, Kris; "Linux Virtualization with Xen"; LinuxDevCenter.com; http://www.linuxdevcenter.com/pub/a/linux/2006/01/26/xen.html; Jan. 26, 2006; pp. 1-3.

Rosen, Rami; "Introduction to the Xen Virtual Machine"; LinuxJournal.com; http://www.linuxjournal.com/article/8540; Sep. 1, 2005; pp. 1-10.

Clark, Bryan; "A Moment of Xen: Virtualize Linux to Test Your Apps"; IBM.com; http://www-128.ibm.com/developerworks/linux/library/l-xen/; Mar. 15, 2005; pp. 1-6.

"A Third Phase of Internet Search"; http://getoutfoxed.com/bookIprint/46; printed on Aug. 28, 2007; p. 1-2.

"Abstract"; http://getoutfoxed.com/bookIprint/36; printed on Aug. 28, 2007; p. 1.

"Beyond Outfoxed"; http://getoutfoxed.com/bookIprint/88; printed on Aug. 28, 2007; p. 1.

"Calculating Levels of Trust"; http://getoutfoxed.com/bookIprint/112; printed on Aug. 28, 2007; pp. 1-2.

"Comparison to Existing Systems"; http://getoutfoxed.com/bookIprint/47; printed on Aug. 28,2007; pp. 1-3.

"Files & Processes"; http://getoutfoxed.com/bookIprint/84; printed on Aug. 28, 2007; p. 1.

"How it Works"; http://getoutfoxed.com/bookIprint/87; printed on Aug. 28, 2007; p. 1.

"Keeping Your Network Clean"; http://getouffoxed.com/bookIprint/108; printed on Aug. 28, 2007; p. 1.

"Novell ZENworks 7 Suite: Your Complete Identity-driven IT Resource Management Solution"; Novell, Inc. Product Guide; http://www.novell.com; (2006); pp. 1-11.

"Novell ZENworks Configuration Management: Complete Systems Management to Lower Your Total Cost of Ownership"; Novell, Inc. Product Guide; http://www.novell.com; (2007); pp. 1-11.

"Novell ZENworks Endpoint Security Management: Total Control from a Single Console"; Novell, Inc. Technical White Paper; http://www.novell.com; (2007); pp. 1-11.

"Novell ZENworks Orchestrator Virtual Machine Management Guide 1.1"; Novell, Inc.; http://www.novell.com; (2007); pp. 1-109.

"Novell ZENworks"; Wikipedia, the free encyclopedia; http://en.wikipedia.org/wiki/ZENworks; Printed on Aug. 28, 2007; pp. 1-3.

"Objections"; http://getoutfoxed.com/booklprint/35; printed on Aug. 28, 2007; p. 1.

"Objections"; http://getoutfoxed.com/booklprint/86; printed on Aug. 28, 2007; p. 1.

"Orchestrating the Data Center with Novell ZENworks"; Novell Solution Flyer; http://www.novell.com; (2007), pp. 1-4.

Tridgell, A. et al., "The rsync algorithm," retrieved at http://www.samba.org/rsync/tech_report/node2.html, Nov. 9, 1998, p. 1.

"Phishing, Spyware, Crapware, Adware"; http://getoutfoxed.com/booklprint/85; printed on Aug. 28, 2007; p. 1.

"Search & Browsing"; http://getoutfoxed.com/booklprint/83; printed on Aug. 28, 2007; p. 1.

James, Stan; "What is Outfoxed?"; http://getoutfoxed.com/about; printed on Aug. 28,2007; pp. 1-2.

Newham, C. et al., "Learning the Bash Shell," 2nd Ed., O'Reilly & Associates, 1998, p. 13.

Nemeth, Evi et al., "Linux Administration Handbook"; Prentice Hall; 2006; 38 Chapter 12—TCP/IP Networking, pp. 276-277.

Silva, G.N., Apt Howto, Chapter 5—Getting Information about packages, Aug. 2001, http://web.archive.org/web/20010911133902/http://www.debian.org/doc/manuals/apt-howto/ch-sourcehandling.en.html.

Silva, G.N., Apt Howto, Chapter 6—Working with source packages, Aug. 2001, http://web.archive.org/web/20010911133902/http://www.debian.org/doc/manuals/apt-howto/ch-sourcehandling.en.html.

Tanenbaum, Andrew S., "Computer Networks"; Third edition; Prentice Hall; 1996; pp. 29, 44.

Tanenbaum, Andrew; "Modern Operating Systems"; Second edition; Prentice Hall, Upper Saddle River, NJ; 2001; pp. 753-757.

"Small World Networks"; http://getoutfoxed.com/booklprint/62; printed on Aug. 28, 2007; pp. 1-2.

"Socially Aware Surfing and Shopping"; http://getoutfoxed.com/booklprint/73; printed on Aug. 28, 2007; p. 1.

"Tagging and Folksonomy"; http://getoutfoxed.com/booklprint/96; printed on Aug. 28, 2007; p. 1.

"Three Magic Ingredients"; http://getoutfoxed.com/booklprint/32; printed on Aug. 28, 2007; p. 1.

"What Outfoxed is Not"; http://getoutfoxed.com/booklprint/34; printed on Aug. 28, 2007; p. 1.

Adorno, Kerry, "Novell Delivers Industry's Most Comprehensive Systems Management Solution"; Novell, Inc.; http://www.novell.com/news/press/novell-delivers-industrys-most-comprehensive-systems-management-solution; Waltham, Massachusetts; Aug. 14, 2007; p.1.

Aiken, Peter et al., Microsoft Computer Dictionary; Fifth Edition; Microsoft Press; 2002.

Bailey, E.C., Maximum RPM, Red Hat Inc., 2000, ISBN 1-888172-78-9, http://www.redhat.com/docs/books/max-rpm/index.html, pp. 1-565.

Cowan, Crispin, Arnold, Seth, Beattie, Steve, Wright, Chris, & Viega, John "Defcon Capture the Flag: Defending Vulnerable code from Intense Attack"; USA; 2003, pp. 1-53.

Cowan, Crispin, Arnold, Seth, Beattie, Steve, Wright, Chris, & Viega, John, "Immunix & Defcon: Defending Vulnerable Code From Intense Attack"; Immunix; USA; 2003.

Cowan, Crispin, Beattie, Steve, Kroah-Hartman, Greg, Pu, Calton, Wagle, Perry, & Gligor, Virgil, "Sub-Domain: Parsimonious Server Security"; Proceedings of the 14th Systems Administration Conference; The Usenix Association; USA; 2000.

Forrest, Stephanie "Computer Immunnology"; ACM; Oct. 1997; pp. 88-96.

Fusco, John, "The Linux Programmer's Toolbox"; Prentice Hall; 2007; Chapter 5, "What Every Developer Should Know about the Kernel," pp. 222-224.

Garfinkel, Simson & Spaford, Gene, "Practical Unix & Internet Security"; Second edition; ISBN 1-56592-148-8; Apr. 1996; Chapters 3.1, 3.2,4.1,4.2.

James, Stan; "Outfoxed in a Nutshell"; http://getoutfoxed.com/nutshell; printed on Aug. 28, 2007; pp. 1-3.

James, Stan; "Outfoxed in a Nutshell: What does Outfoxed add to my Browser?"; http://getoutfoxed.com/nutshell/ node/106; printed on Aug. 28, 2007; pp. 1-3.

Bhuta et al., "A framework for identification and resolution of interoperability mismatchs in COTS based system", IEEE IWICSS, 2007, pp. 1-6.

Gill et al., "Resuability issued in component based development", ACM, 2003, pp. 1-5.

Lymer et al., "Experience in using business scenarios to access COTS components in integrated solutions", ACM, 2005, pp. 1-15.

Chapman et al., "Contemplating systemic software reuse in project centric company", AMC SAICSIT, 2008, pp. 16-26.

YourDictionary.com, Remote boot, retrieved on Jan. 5, 2010 from https://www.yourdictionary.com/computer/remote-boot.

* cited by examiner

| | Kernel XYZ | Security ABC | File System XYZ | Encryption MNO | Mail Server ABC |
|---|---|---|---|---|---|
| Kernel XYZ | | X 430 | | | |
| Security ABC | X 431 | | | | |
| File System XYZ | | X 433 | X 432 | | |
| Encryption MNO | | | | | X 435 |
| Mail Server ABC | | | | X | X 434 |

FIG. 4

SYSTEM FOR CREATING A CUSTOMIZED SOFTWARE INSTALLATION ON DEMAND

RELATED APPLICATION DATA

This application is related to co-pending, commonly assigned U.S. patent application Ser. No. 11/134,535, titled "SYSTEM FOR CREATING A CUSTOMIZED SOFTWARE DISTRIBUTION BASED ON USER REQUIREMENTS," filed May 19, 2008 by the same inventors, hereby incorporated by reference.

FIELD OF THE INVENTION

This invention pertains to allowing a user to create a customized installation of software packages, and more particularly to enabling users to select and verify the interoperability, at run-time, of a software installation.

BACKGROUND OF THE INVENTION

Software distributions are typically built into an installation program and stored on a compact disc (CD), to be purchased by the customer. Such distributions usually include at least one program file and a number of other packages that work with the program file to provide additional functionality and features. These CDs are prepackaged and designed to include features that the company selling the software thinks will be desired by customers.

Manufacturers of such software products recognize that a "one size fits all" mentality often does not work for all clients. Thus, manufacturers sometimes produce multiple different versions of a software package. For example, application suites are very popular products today. Most versions include a word processor and a spreadsheet program. But some versions might include a database package, whereas other versions might include a slideshow generating program. Still other versions might include stripped-down versions of the products, priced to sell to students and educators. By offering different versions of the product, the manufacturer hopes that as many customers as possible will be satisfied by the different versions, thereby maximizing the manufacturer's sales.

This approach to building pre-packaged software installations is used not just with application software, but also with operating systems. For example, in selecting a Linux® distribution, a customer must choose between different packages of distributions that have been released and are available in off-the shelf combinations. (Linux is a registered trademark of Linus Torvalds.) A customer typically chooses a Linux distribution by first selecting a vendor who sells Linux distributions, and then identifying a particular distribution available from the vendor that has the most features that the customer is looking for. But if a customer wants a finer level of control in selecting the structure of the Linux distribution, the customer is usually left wanting.

Accordingly, a need remains to allow a user to create a customized software installation, including only packages that the user wants, verifying that the installation will be operable at run-time, and including any required package dependencies.

SUMMARY OF THE INVENTION

A customized installation is created by allowing a user to select packages that the user is interested in installing. During the process, the user is informed if two of the packages that were selected will not be interoperable with each other at run-time. The user is then given an opportunity to resolve the conflict. In cases where packages conflict or will not work together at run-time, a different package can be selected to serve the purpose. After verification that the selected packages do not conflict, the user then can then install the customized installation by installing the selected packages.

The foregoing and other features, objects, and advantages of the invention will become more readily apparent from the following detailed description, which proceeds with reference to the accompanying drawings.

BRIEF DESCRIPTION OF THE DRAWINGS

FIG. 4 shows an example table in the database of package run-time conflicts of FIG. 1.

DETAILED DESCRIPTION OF THE PREFERRED EMBODIMENT

Figure 1:
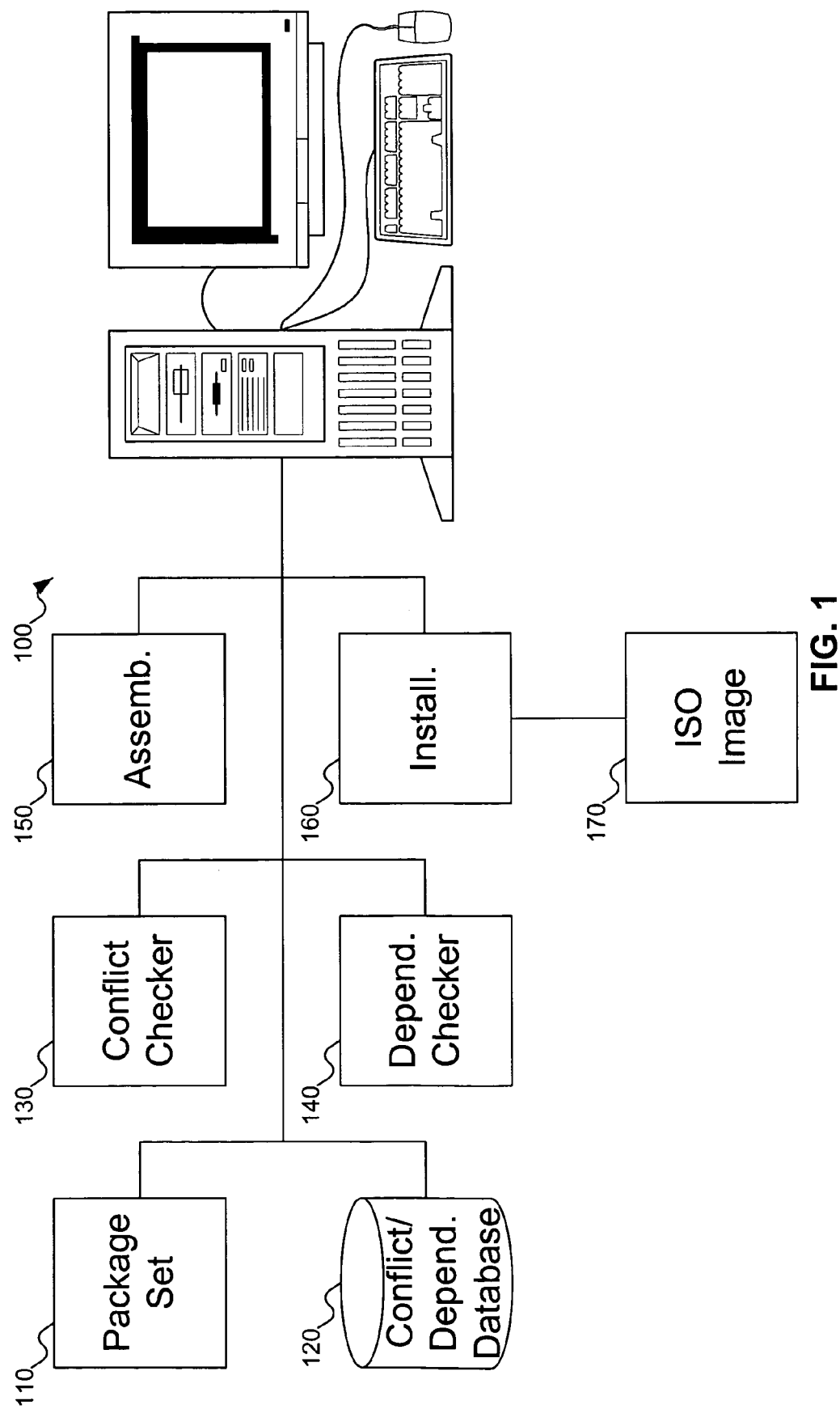
FIG. 1 shows a system on a computer configured to support a distribution of Linux on demand, according to an embodiment of the invention.

FIG. 1 shows a system on a computer with a set of available packages, a set of user requirements, a database with dependency and run-time conflict information, a conflict checker, a dependency validator, an assembler to assemble a customized installation, an installation, and a backup ISO image of the installation according to an embodiment of the invention. Computer 100 includes all the typical elements of a computer, such as a central processor, memory, bus, disk space, etc. Also, computer 100 can be accessed locally by the user, or remotely over a network, such as a LAN, WAN, the Internet, etc., which can be reached via either a wired or a wireless (such as IEEE 802.11a/b/g/n, among others) connection.

Available on computer 100 is a set of, for example, Linux packages 110 available for the customized installation. The set of Linux packages 110 are packages that have been developed for Linux and are available to Linux users. The packages can include, for example, versions of the Linux kernel, as well as other software by developers from all over the world. The packages can either be open source or closed source, but typically the packages are compiled modules, rather than source software that the user has to then build into an executable module. Each of these packages is designed to address a particular aspect of the installation. For instance, in one embodiment of the invention there could be a package that involves computer security or that acts as a mail server. Typically, the set of Linux packages 110 is distributed as a compact disc (CD), but a person skilled in the art will recognize that the set of Linux packages 110 could be distributed in other manners: for example, by being available for download from a website across a network.

Giving users control over the packages that go into a Linux installation introduces complexities that can prevent the Linux system from running properly. For example, packages must be interoperable at run-time, meaning that no packages in the installation have conflicts. Also, if any packages in the installation have dependencies, then those dependencies must also be included in the installation in order for the Linux system to function properly. Embodiments of the invention are designed to ensure that these issues are properly addressed.

In an embodiment of the invention, some packages in the set of the packages 110 can be designed to operate by themselves (other than needing the kernel). There can also be packages that are to be used in conjunction with one or more other packages. In some cases, the two packages provide features that complement one another. In other cases, one of the packages is a primary package that the secondary package depends on. In these second cases, there is a dependency between the primary package and the secondary package. If an installation includes the secondary package but not the primary package, the secondary package might not operate properly (if it operates at all). Thus, dependencies are a concern that needs to be addressed and are described in greater detail below.

In addition, some packages in the set of packages 110 might not be compatible with other packages. In other words, these packages conflict; they are not interoperable at run-time. While one or the other of the packages can work at run-time, both might not. Users installing a customized Linux installation obviously would expect that all the packages built into the installation will run. Thus, conflicts are a concern that needs to be addressed.

To solve these problems, computer 100 includes database 120 that stores conflict and dependency information, making it possible to verify that no packages will conflict at run-time and that all required dependencies will be included.

Computer 100 also includes a conflict checker 130 to ensure that none of the selected packages will conflict at run-time, and a dependency validator 140 to validate that all dependencies of selected packages are also selected. Once the Linux packages have been selected and checked for conflicts and dependencies, an assembler 150 can then assemble the selected packages into an installation 160. In one embodiment of the invention, the assembler assembles the installation 160 as an ISO image file 170. All of these elements are discussed in greater detail below.

Figure 2:
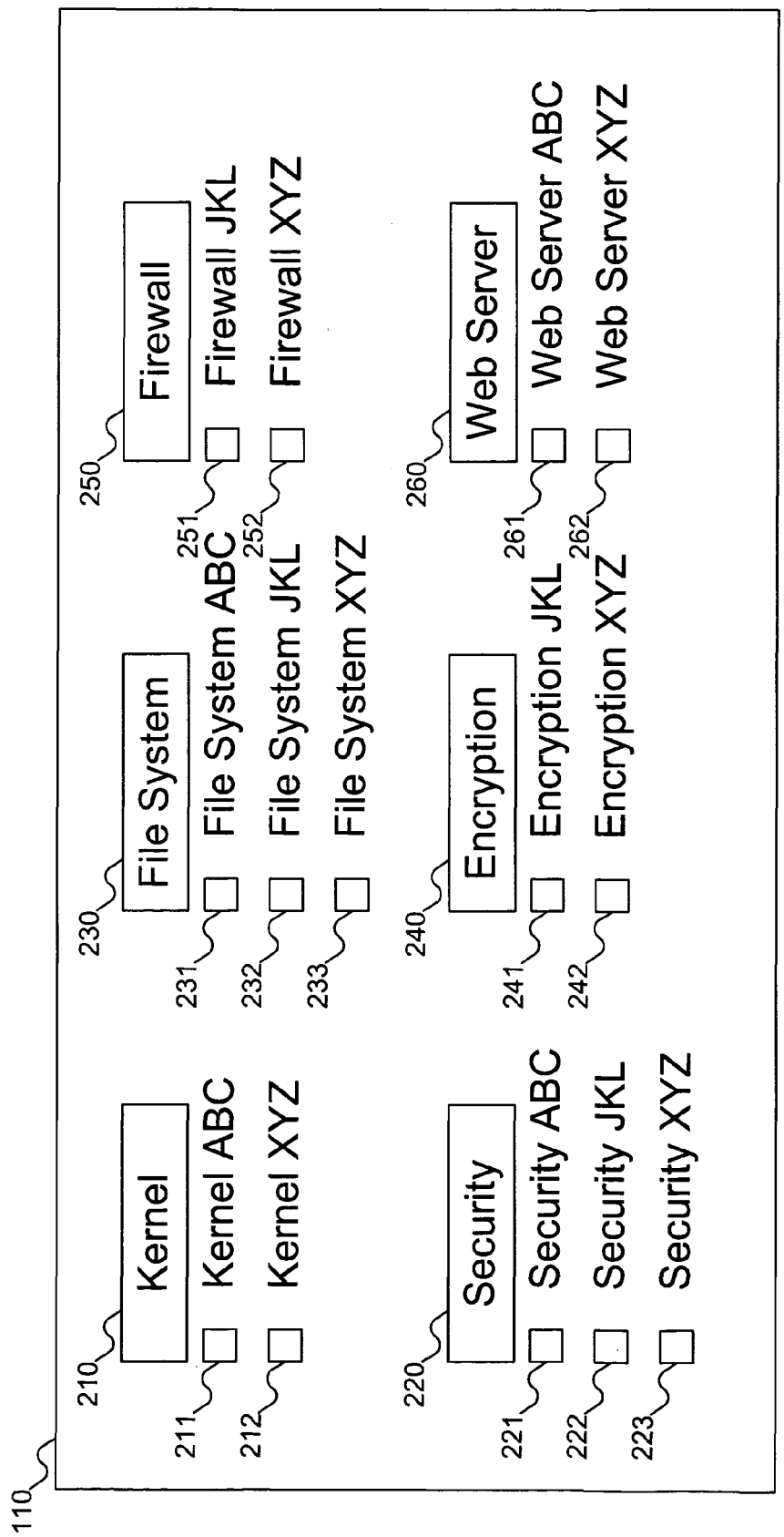
FIG. 2 shows an example of the set of packages of FIG. 1 that are available for user selection.

FIG. 2 shows an example of a set of packages 110 in FIG. 1 that are available for selection, according to an embodiment of the invention. In the example set of packages 110, there are six package categories, kernel 210, security 220, file system 230, encryption 240, firewall 250 and web server 260, as well as two to three packages for each category. While the present embodiment has only six categories and fourteen packages, a person skilled in the art will recognize that the categories are not required. In addition, the set of packages can be organized into any number of categories, and any number of packages per category (and, of course, any number of total packages).

In an embodiment of the invention, a deployment tool can be used to investigate the computer environment of the user. The selection of the packages can be done automatically for the user based on the packages that are in the user's current Linux system. After the deployment tool has identified what packages are currently on the user's system, an installation is built using the most recent versions of those packages (along with any other packages necessary or deemed of interest).

In another embodiment, a user of the system will be familiar with Linux and its respective packages, and will have preferences on which packages he is interested in installing. For example, a user might be particularly interested in getting the security package XYZ, as well as the encryption package XYZ. With the checkbox embodiment of FIG. 2, the user would select a kernel of his choice 211 or 212, and then also select security XYZ 223, and encryption XYZ 242. And finally in another embodiment, a user might not be interested in security, but might need a file system 230, a web server 260, and a firewall 250. Again, the user likely has particular packages in mind, and can select the appropriate packages. But if the user has no particular preferences for certain features, the system can provide default selections, or make recommendations on those features (based, for example, on levels of compatibility among the various user-selected packages). While checkboxes are the user interface element used in the example of FIG. 2, a person skilled in the art will recognize that there are other means of identifying selected packages for an installation, e.g., list box, search boxes, etc.

In an embodiment of the invention, the packages that are built into an installation are compiled binary files that the user will be able to run immediately after installing the installation. In the prior art, customers built installations by compiling source code components from different vendors. Because compiler settings can affect the behavior of software, even technically skilled users could inadvertently build an installation that would not work as intended. By providing the user with compiled modules, embodiments of the invention avoid these problems, and save the user time (in that the user does not have to spend time building the installation from the source code).

Figure 3:
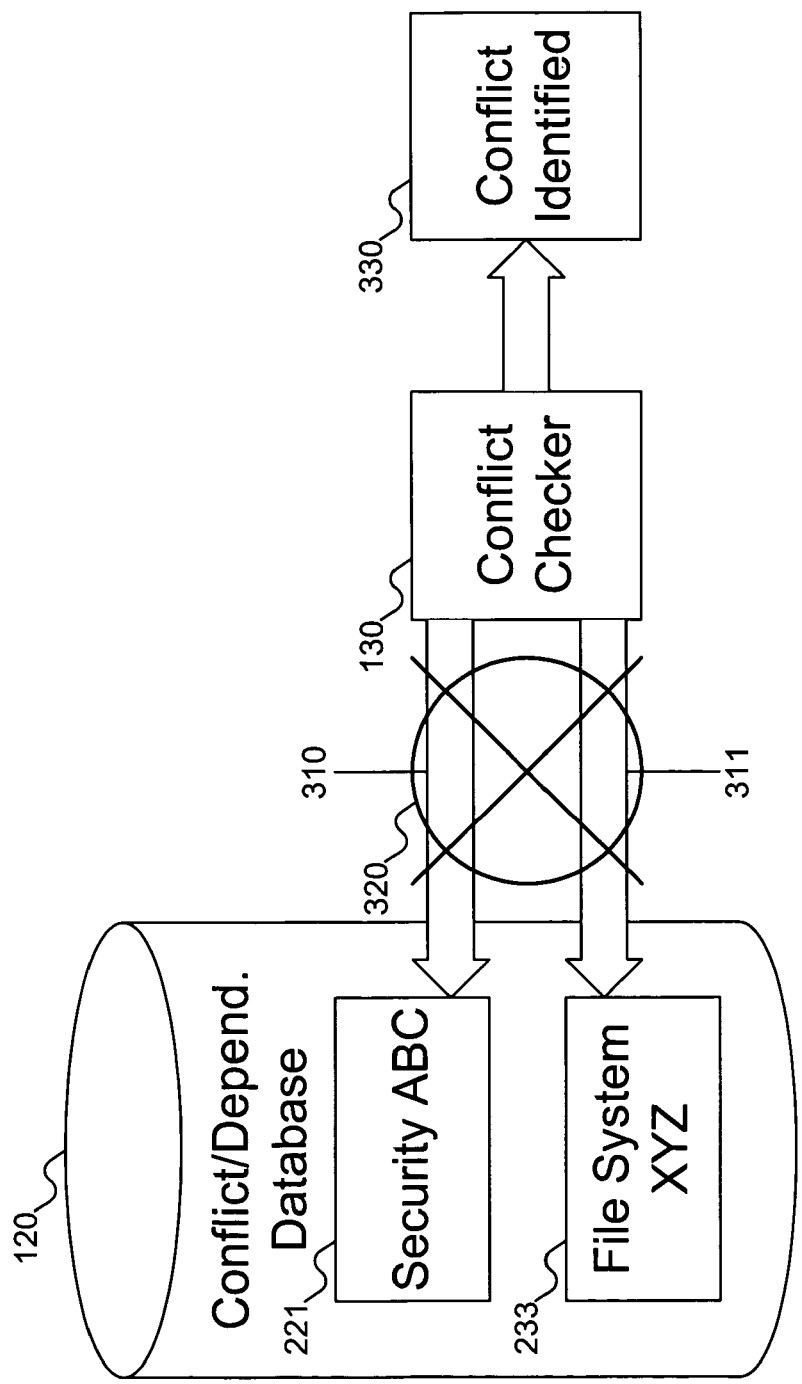
FIG. 3 shows an example of two packages from the database of run-time conflict information of FIG. 1 that will conflict at run-time.

FIG. 3 shows an example of the computer of FIG. 1 identifying two packages that will conflict at run-time using the database of run-time conflict information in FIG. 1, according to an embodiment of the invention. In FIG. 3, the installation includes packages "security ABC" 221 and "file system XYZ" 233. The conflict checker 130 obtains information about the security ABC package 221 from conflict database 120 with locator 310, and information about file system XYZ package 233 from conflict database 120 with locator 311 (which can, of course, be the same locator). In the example shown in FIG. 3, conflict checker 130 determines that the packages conflict, represented by conflict symbol 320, and presents message 330 to the user, so that the conflict can be resolved.

In another embodiment, the selected packages might be packages that do not conflict at run-time. In this case, the conflict checker 320 does not prompt the user to resolve the package conflict, and instead compares the other packages in the set of selected packages in search of conflicts. FIG. 4 shows an example database table in the database in FIG. 1 that records packages that conflict at run-time, according to an embodiment of the invention. Table 120 is a table with rows 410-414 and columns 420-424 representing the various packages, such as Kernel XYZ 410. In the example shown in FIG. 4, there is only conflict information for five packages, but a person skilled in the art will recognize that in other examples there can be any number of packages.

Conflict information is represented by an X, such as Xs 430, 431, 432, 433, 434, 435, in entries in table 200. For each pair of packages that has a conflict, table 200 stores an indication of this conflict in the appropriate table entry. For example, X 430 represents a conflict between package "security ABC" in column 221 and package "kernel XYZ" in row 210. The conflict 430 means that an installation containing both kernel XYZ and security ABC will not be interoperable at run-time. In other words, while the kernel XYZ package can operate on its own, and can interoperate with other packages, kernel XYZ does not interoperate with security ABC at run-time. (Presumably, there is some other version of the kernel that interoperates with security ABC, or else security ABC cannot be used at all.)

Although FIG. 4 shows conflict information being arranged in an N×N table, where N is the total number of packages, a person skilled in the art will recognize that there are other ways of recording conflict information. For example, database 120 includes redundant information, in that every combination of packages is represented twice, e.g., Xs 430 and 431 both represent a conflict between kernel XYZ and security ABC. Other embodiments of the conflict information can include linked lists, arrays, etc. In addition, a person skilled in the art will recognize that other conflict combinations are possible, and will recognize how to modify database 120 to store this additional information. For example, there may be three different packages, which include no pair-wise conflicts, but as a trio conflict.

Figure 5:
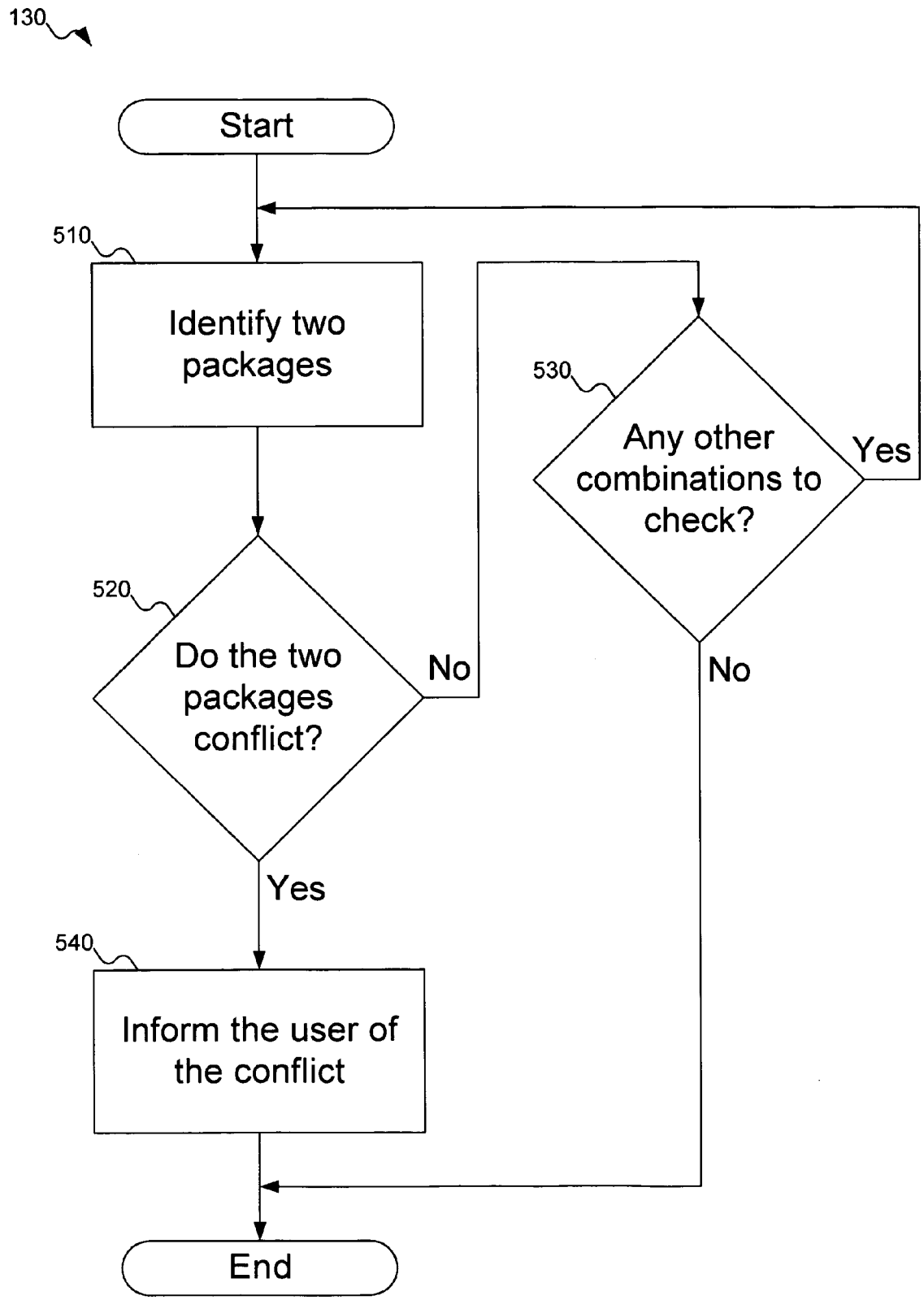
FIG. 5 shows a flowchart of the procedure used by the conflict checker of FIG. 1 to resolve conflicts in packages.

FIG. 5 shows a flowchart that the conflict checker 130 in FIG. 1 uses to resolve run-time conflicts in packages, according to an embodiment of the invention. In step 510, the conflict checker starts by identifying two of the packages that have been selected for the installation. In step 520, the conflict checker refers to the database to see if the packages have a run-time conflict. This can be accomplished, among other ways, by having the database store, for each package, a list of other packages with which the first package conflicts. A person skilled in the art will recognize that this information can be stored in a number of different manners: for example, by using a list for each package, or by creating a table showing pairs of packages and flagging which combinations have conflicts. (A person skilled in the art will also recognize that conflicts can extend beyond pairs of packages: for example, there can be three packages which do not pair-wise conflict, but as a trio conflict.) If there is a conflict with the packages, the user is alerted with a message at step 540. Otherwise, at step 530 the conflict checker looks to see if there is another combination of packages to check. If there are no more combinations, the conflict checker finishes, having successfully validated that no selected packages contain any run-time conflicts. If there are more combinations of selected packages, the conflict checker 130 then goes back to step 510 and begins the process all over again. FIG. 5 is described in an abstract model (for example, FIG. 5 does not specify exactly how the conflict checker selects packages in step 510). But a person skilled in the art will recognize how to adapt FIG. 5: for example, by using nested loops to select pairs of packages. A person skilled in the art will also recognize how to adapt FIG. 5 to check for conflicts among groups of packages larger than two.

In an embodiment of the invention, the conflict checker analyzes all combinations of packages before alerting users of existing run-time conflicts. The system then notifies the user as to which packages had conflicts, and prompts the user to make a different selection of packages that do not conflict at run-time. When the user has made a different selection, the conflict checker again checks to see if the new selection of packages has introduced any new conflicts between packages.

In another embodiment of the invention, the conflict checker can provide the user with a recommendation for resolving the current run-time conflict. Sometimes a conflict between packages might have a relatively straightforward resolution. For example, there might be one package that conflicts with several others. If those other packages do not conflict with any more packages, then the system could recommend an alternative package to the one that is causing the numerous conflicts.

In yet another embodiment, a means of resolving a package conflict might not be as straightforward. For example, it could be the case that two packages conflict with each other, but not with any other packages in the set of selected packages. In this case, it is not necessarily clear which of the two conflicting packages should be replaced with an alternative non-conflicting package. In this case, the conflict checker can at least alert the user to which packages are in conflict.

Figure 6:
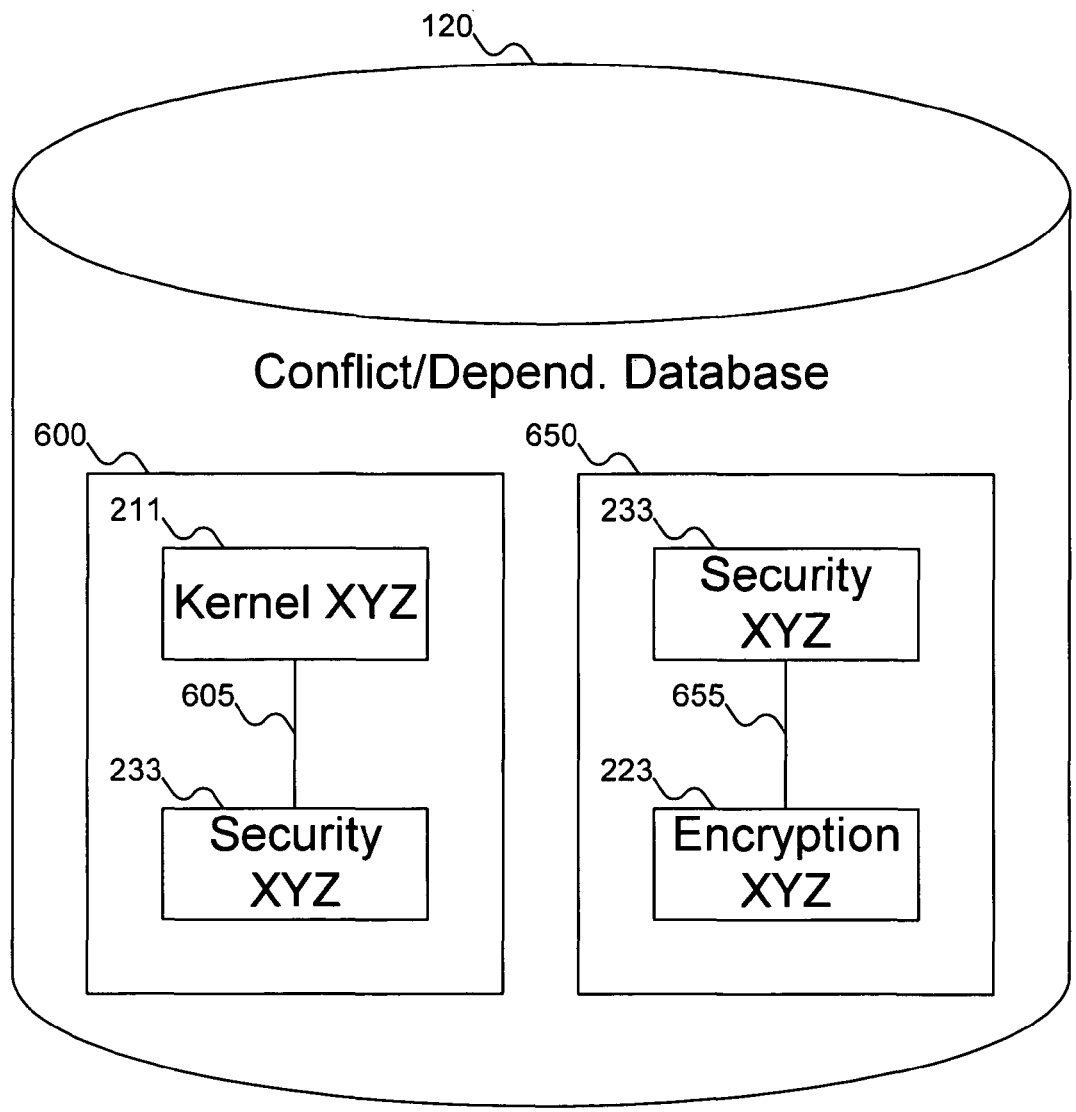
FIG. 6 shows an example of dependency information that is stored in the database of FIG. 1.

FIG. 6 shows an example of dependency information that is stored in database 120 in FIG. 1, according to an embodiment of the invention. In the present embodiment, two dependencies are shown. In dependency 650, Encryption XYZ 223 has a package dependency of Security XYZ 223. So if Encryption XYZ 223 is in the installation, then Security XYZ 223 should also be included in the installation for the encryption software to run.

Similarly, dependency 600 shows that Security XYZ 233 requires that Kernel XYZ 211 be selected and included in the installation. As a result, a selection of Encryption XYZ 223 will require that not only Security XYZ 233 be selected and included in the installation, but also that Kernel XYZ 211 be selected and included in the installation.

As can be seen, the example of FIG. 6 shows only immediate dependencies, under the assumption that any indirect dependencies are captured by checking the dependency information for the needed package. Thus, dependency 650 does not reflect that Encryption XYZ 223 depends (indirectly) on Kernel XYZ 211, as this information is represented through dependency 600. But a person skilled in the art will recognize that database 120 can store all the dependencies for a single package, whether direct or indirect. Thus, dependency 650 can be modified to reflect that Encryption XYZ 223 is also dependent on Kernel XYZ 211.

Figure 7A:
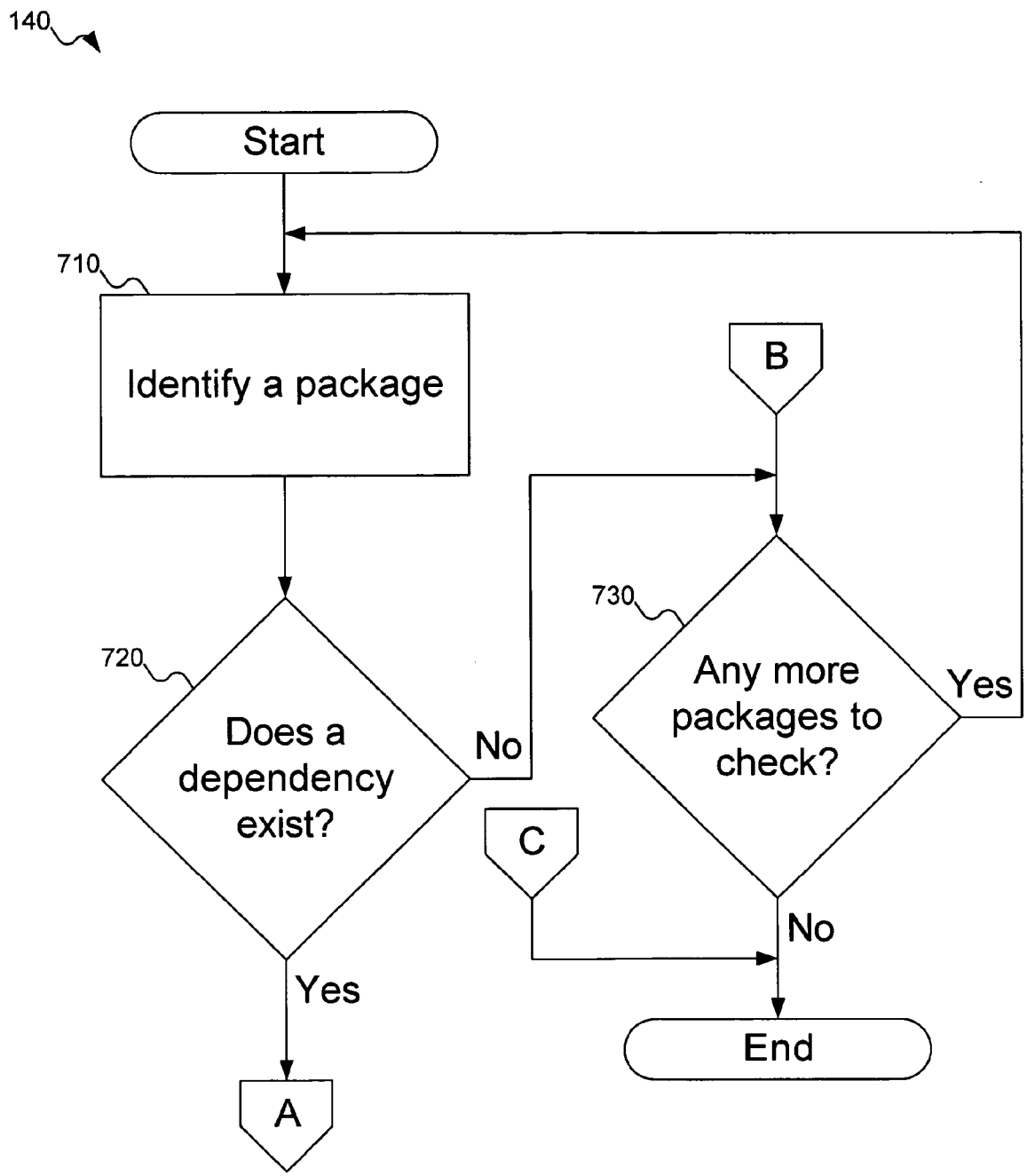
FIGS. 7A-7B show a flowchart of the procedure used by the dependency validator of FIG. 1 to validate that the necessary package dependencies are included in the customized installation.
Figure 7B:
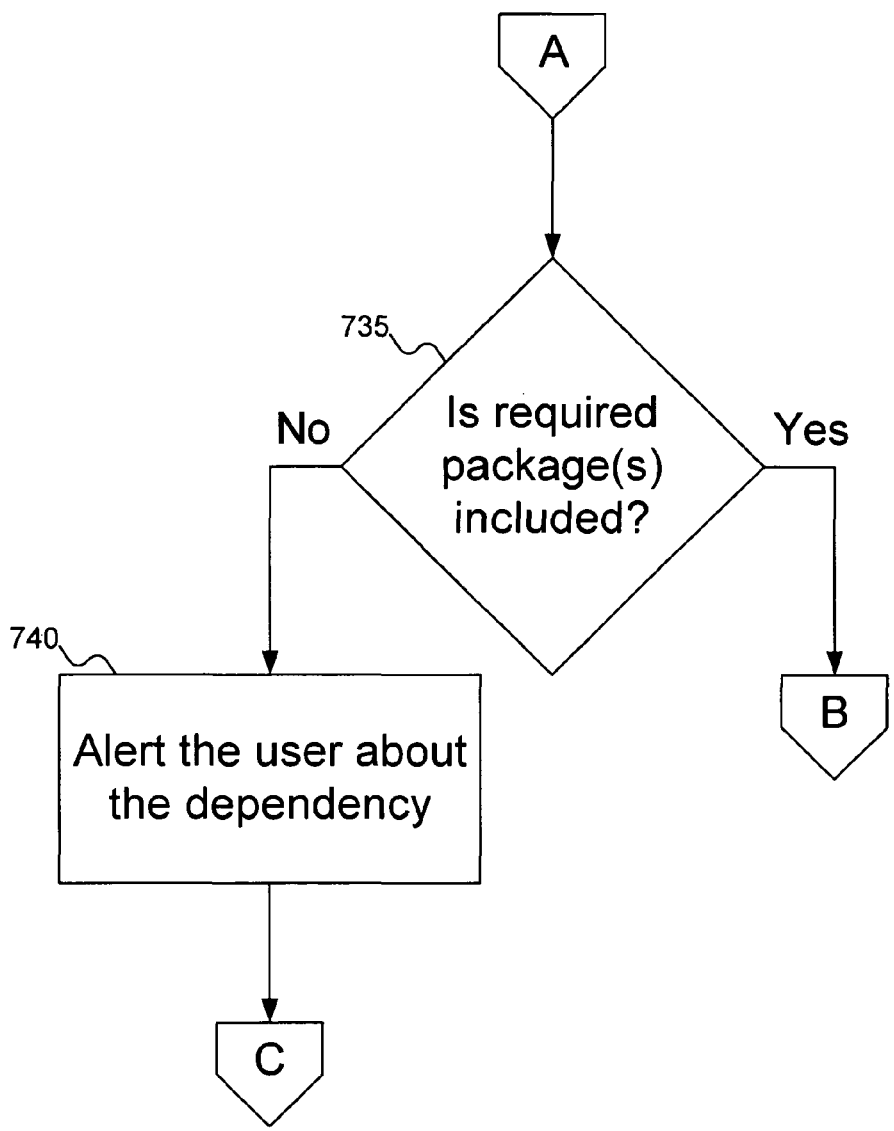

FIGS. 7A-7B show a flowchart of the procedure used by the dependency validator 140 of FIG. 1 to validate that the necessary package dependencies are included in the customized installation, according to an embodiment of the invention. In FIG. 7A, at step 710, the dependency validator begins by identifying a package. In step 720 the dependency validator looks up that package in the dependency database 120, and checks to see if that package depends on any other packages. If a dependency does not exist, then the dependency validator goes to step 730 and checks to see if there are more packages that need dependency checking. If at step 730 there are more packages to check for dependencies, then the dependency validator returns to step 710 and identifies the next package to move through the flowchart again. However, if at step 730 there are no more packages that need to be checked for dependencies, the dependency validation is complete, and the selected packages can be built into an installation with the assurance that all required dependency packages are included.

If at step 720, a dependency does exist for the package being checked, then the dependency validator goes to step 735 (in FIG. 7B), and checks to see if the needed package(s) is/are included in the selected set of packages. If the needed package(s) is/are not selected for inclusion in the installation, then at step 740 the dependency validator alerts the user of the missing package(s) so that the needed package(s) can be selected and included in the installation (or, alternatively, the selected package removed from the installation to avoid including the needed package). If at step 735 the needed package is selected for inclusion in the installation, then the dependency validator goes back to step 730 (in FIG. 7A) where, as described above, the dependency validator checks to see if there are any more packages that need dependency validation.

While one embodiment of the invention alerts the user to a dependency issue as soon as a problem is identified, another embodiment can check all the packages in the selected set and identify all missing but needed packages before alerting the user of the missing packages. In yet another embodiment, the dependency checker can check for dependency packages as soon as a package is selected. While packages are being selected, it can select the dependency package and note the automatic selection of the additional package (so that the user is aware of this automatic selection). If a needed package is removed from the set of selected packages, then the original package can be removed as well (again, with the system notifying the user of this automatic action). In one embodiment, the alerts of dependency packages can be in the form of a dialog box, but a person skilled in the art will recognize that there are other ways of alerting the user of missing dependencies, such as text in the selection interface itself, log files or windows, etc.

While the embodiments of dependencies described thus far have included a package with only one dependency package, a package can also be dependent on the existence of at least one package in a set of packages. For example, a particular security package might not require a specific kernel, but rather any kernel of a specified version or greater. In this situation, when the dependency validator sees the particular security package, the dependency validator then checks for a kernel that is in the set of dependency packages that will satisfy the dependency requirement for the security package. Similarly, a selected encryption package can only require that a security package be included for the encryption package to be operable. In this case, it is not important which security package is included, only that one security package is included. A person skilled in the art will also recognize other combinations of dependencies that can be tested for.

Figure 8:
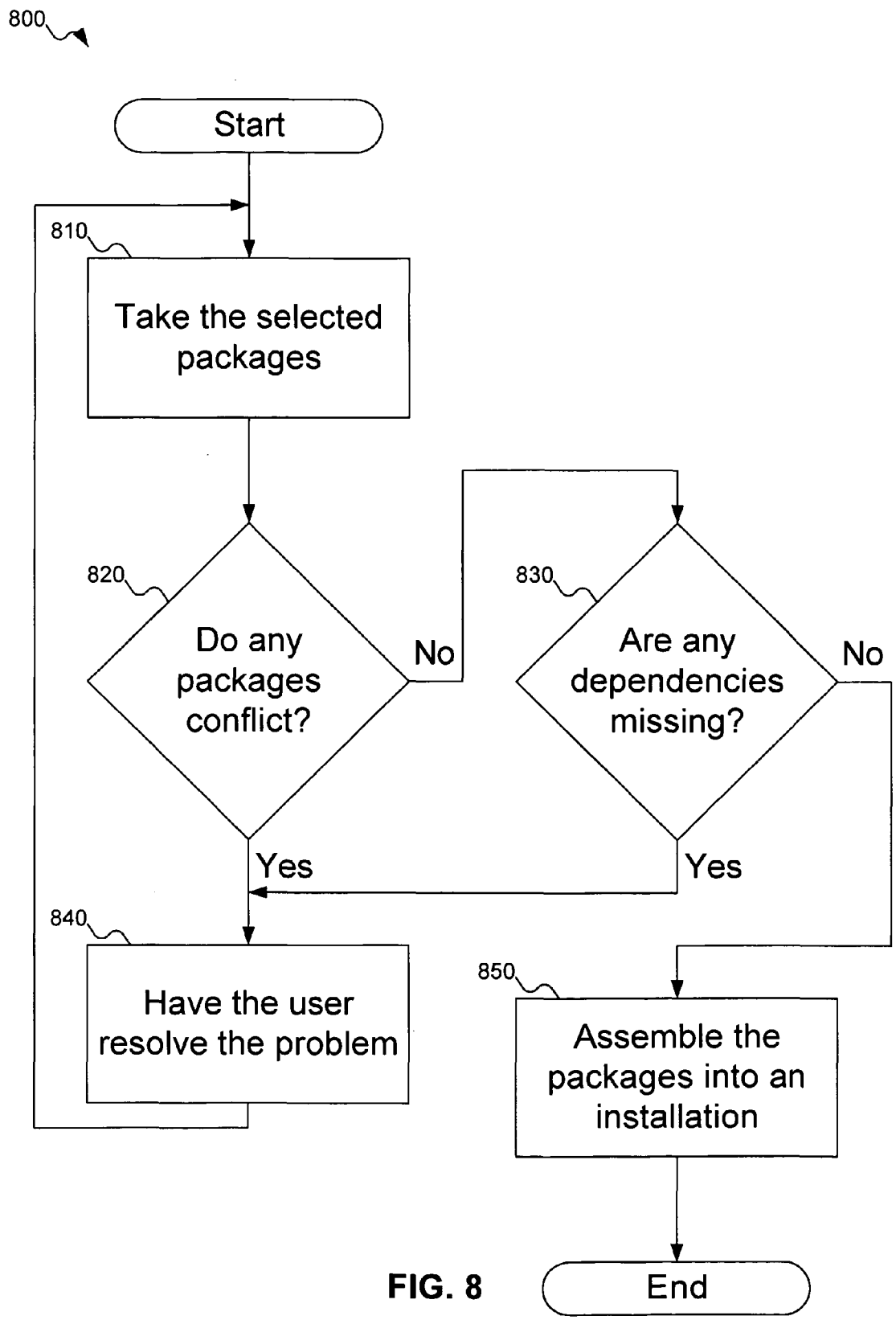
FIG. 8 shows a flowchart of the procedure used by the assembler of FIG. 1, to assemble an installation with both dependency package validation and conflict resolution for all packages in the installation.

FIG. 8 shows a flowchart of the procedure used by the assembler 150 in FIG. 1 with both dependency package validation 140 and conflict resolution 130 for all packages in the installation, according to an embodiment of the invention. In step 810, the assembler starts with the set of selected packages. In step 820 the assembler checks to see if any packages conflict, as described above with reference to FIG. 5. If no packages conflict, then the assembler goes to step 830 and validates that the necessary dependency packages are included in the set of selected packages, as described above with reference to FIGS. 7A-7B.

If at step 820 the conflict checker 140 identifies packages that will conflict at run-time, or if at step 830 the dependency validator 130 identifies dependencies that must be selected and included in the installation, the assembler goes to step 840 where it prompts the user to resolve the issues in the selected packages. If at step 830 the dependency validator finds no missing dependencies (and no conflicts), the assembler goes to step 850 where the packages are assembled into an installation, which can then be installed on a computer.

Figure 10:
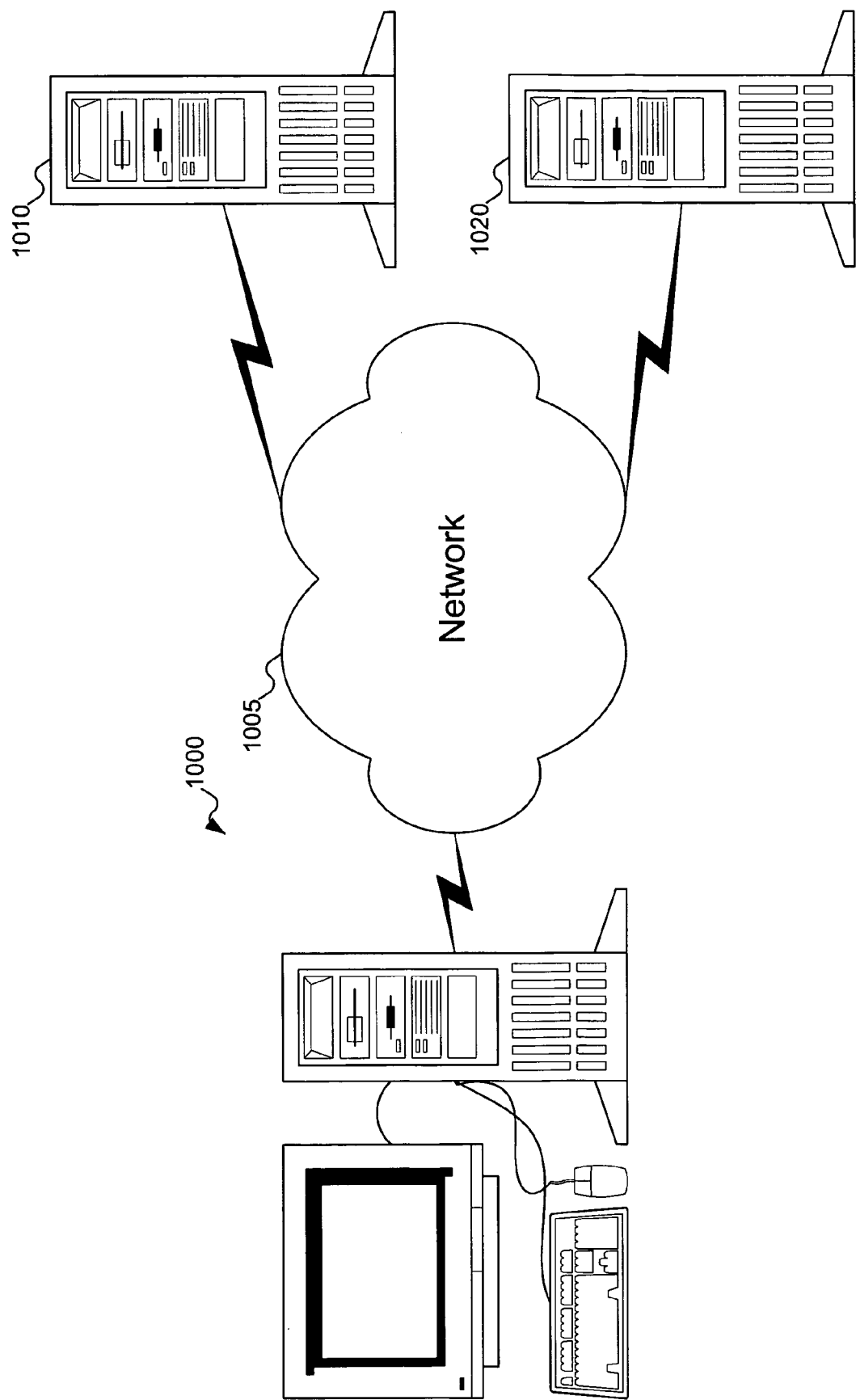
FIG. 10 shows a system where the computer of FIG. 1 is a bootstrap server capable of installing the installation on to remote servers.

After the conflict checker and dependency validator successfully certify the packages in the installation, the installation is ready to be installed. In one embodiment of the invention, the installation can be installed over a network to a remote server. FIG. 10 shows a system where the computer in FIG. 1 is a bootstrap server capable of installing the installation on to remote servers, according to an embodiment of the invention. Bootstrap server 1000 includes the elements of the computer in FIG. 1, with a set of packages available for user selection, a conflict checker, a dependency validator, and an assembler with an assembled installation, and an ISO image of the installation. After the installation has been assembled, bootstrap server 1000 remotely boots destination server 1010, and installs base kernels to destination server 1010. Then destination server 1010 can install the other selected packages in the customized installation.

In one embodiment of the invention, bootstrap server 1000 could save a backup of the installation, so that the installation could be replicated if necessary. In an embodiment of the invention the backup of the installation can be represented as an ISO image of the installation.

Also, in another embodiment of the invention, bootstrap server 1000 could serve as a cache of all packages in order to have dependency packages available in the future. If a user installs a package in the future that has a needed dependency package that is not included in the user customized installation, then the cache provides access to the dependency package. While this embodiment uses one destination server, it would be obvious to a person skilled in the art that any number of destination servers could be used.

Figure 9:
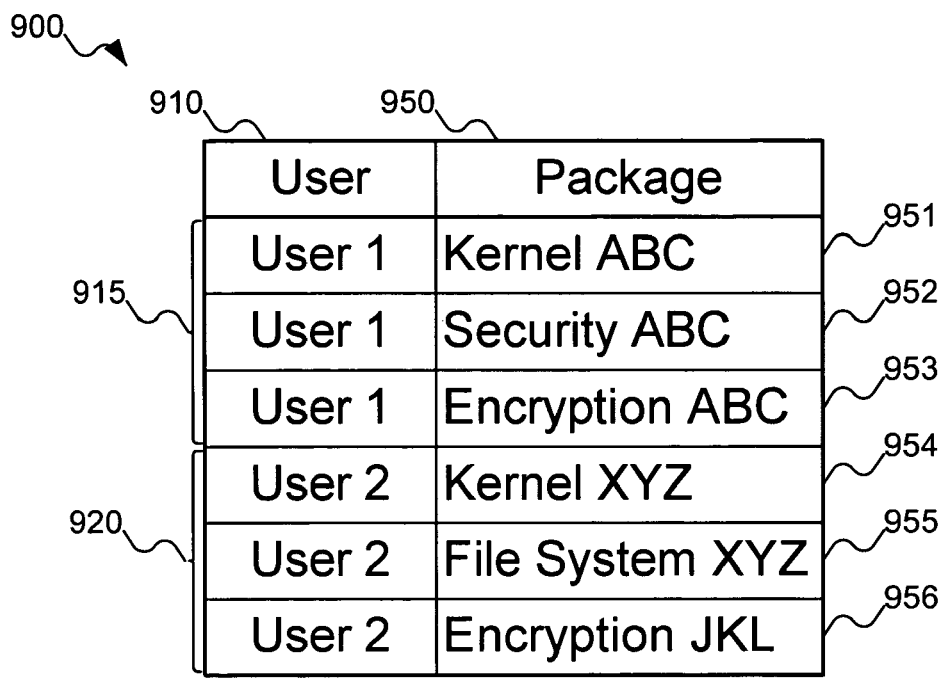
FIG. 9 shows a table identifying what packages a particular user received in the installation of FIG. 1.

In another embodiment of the invention is a way to retain information about what packages are included in a particular customer's customized Linux installation. FIG. 9 shows a database table identifying what packages a particular user received in the installation in FIG. 1, according to an embodiment of the invention. After an installation is built for a user, information is stored to identify what packages were included for the user.

In table 900, Users in column 910 are matched with Packages in column 950. User 1 in entry 915 created an installation that included Kernel ABC 951, Security ABC 952, and Encryption ABC 953. In the event that, for example, Encryption ABC 952 is updated, this new version of the package can be added to the set of packages available for creating a customized Linux installation. However, this updated package can also be distributed to users who have the previous version of Encryption ABC 952. A query for Encryption ABC 952 in Package table 900 identifies User 1 in entry 915 as having installed Encryption ABC 952. This way, User 1 can be notified of the update, for example, by e-mail, and can install the update if desired. Similarly if Encryption JKL 956 is updated, User 2 in entry 920 can be notified of the update. Although FIG. 9 shows the package information being stored as a table, a person skilled in the art will recognize that there are other ways of recording package information, such as linked lists, arrays, etc.

While currently it is possible to notify Linux users when updates to packages are available, an embodiment of the invention makes it possible for users of a customized Linux installation to receive notifications only when a package that is in the user's own customized version is updated. In this way, the user does not get bombarded with notices of updates to packages that the user does not have.

Another embodiment of the invention includes a deployment tool that checks for updates to packages in a user's Linux environment. In one embodiment the deployment tool can be set up to automatically use the Internet to see if any patches are available to packages in the user's Linux environment. The deployment tool can be set up to check on a periodic basis, for example every month. A person skilled in the art will recognize that this periodic basis could be any set period, or that this period can be set as a preference of the user.

In addition to automatically checking for updates to packages, the deployment tool can also allow users to run query for updates on demand. Instead of having the update checking as a process that is started automatically, users can manually start the process. A person skilled in the art will recognize that some users might prefer to always have the updates to their packages, while other users might prefer to always be notified of the package updates, in order to approve of the updates before the updates are installed.

In addition to being able to provide customized notifications of package updates, the information in table 900 in FIG. 9 can be used by a Linux vendor as a basis for a customer support agreement. That way, a customer is able to get support for packages included in the customer's installation. Similarly, the vendor knows what packages the customer is entitled to support.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments and examples, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments. Descriptions of the embodiments by reference to Linux are illustrative; the invention can be used with other operating systems and software distributions.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A user-customized installation system for software packages, comprising:
   a computer;
   a set of available software packages available on the computer;
   a selector to select a subset of the set of available software packages, the selected subset including at least a first package, a second package, and a third package and omitting a non-included package;
   a database including an indication that the first package and the second package do not conflict at run-time, a second indication that the first package and the third package conflict at run time and a third indication that the first package and a fourth package do not conflict at run-time;
   a validator to validate that the first package and the second package do not conflict at run-time using the database;
   an assembler to remove the third package from the selected subset of the set of available software packages and include the fourth package in the selected subset of the set of available software packages;
   an installation builder on the computer to build the user-customized installation including the selected subset of the set of available software packages, the user-customized installation to install the selected subset of the available software packages on a machine of the user;
   an update to a package in the user-customized installation, the update to the package in the user-customized installation becoming available after the user-customized installation was built by the installation builder;
   a notifier so that the user-customized installation system can notify the user of the update without the machine of the user checking whether the update exists; and
   an installer to install the update on the machine of the user after the installation of the user-customized installation on the machine of the user;
   where the update to the package in the user-customized installation can become available either before or after the installation of the user-customized installation on the machine of the user.

2. A system according to claim 1, further comprising a recommender to recommend the fourth package to add to the selected subset of the set of available software packages.

3. A system according to claim 1, further comprising:
a database of package dependencies, a dependency including an indication that the first package in the user-customized installation depends on a fifth package in the set of available software packages; and
an adder to add the fifth package to the selected subset of the set of available software packages.

4. A system according to claim 3, wherein the adder is operative to automatically add the fifth package to the user-customized installation.

5. A system according to claim 1, wherein the system further comprises:
a server including the set of available software packages; and
a destination capable of a remote boot, where the destination includes the machine of the user operative to boot responsive to receiving an instruction to boot the destination from the computer, the instruction not responsive to a communication from the destination.

6. A system according to claim 5, wherein:
the destination includes a first destination and a second destination; and
the system further comprises an installer to install the user-customized installation on the first destination and the second destination at the same time.

7. A system according to claim 5, comprising a backup copy of the user-customized installation.

8. A system according to claim 1, further comprising an installer to install the user-customized installation on the machine of the user.

9. A system according to claim 1, wherein the set of available software packages includes a set of Linux software packages.

10. A method for generating a customized installation of software in a machine on demand for a user, comprising:
accessing a set of available software packages;
selecting a subset of the set of available software packages, the subset including least a first package and a second package and omitting a non-included package;
identifying that there is a conflict between the first package and the second package;
removing the first package from the subset of the available software packages;
selecting a third package that does not conflict with the second package at run-time;
adding the third package to the subset of the available software packages;
assembling the subset of available software packages into the customized installation, the customized installation to install the selected subset of the available software packages on a machine of the user;
notifying the user by a system generating the customized installation when an update to a package in the customized installation is available without the user checking whether the update exists, the update to the package in the customized installation becoming available after the user-customized installation was assembled; and
installing the update on the machine of the user after installing the customized installation on the machine of the user,
where the update to the package in the customized installation can become available either before or after installing the customized installation on the machine of the user.

11. A method according to claim 10, further comprising recommending the first package to be removed from the subset of the available software packages.

12. A method according to claim 11, further comprising recommending the third package to be added to the subset of the available software packages.

13. A method according to claim 10, further comprising:
identifying that the first package in the customized installation depends on a fourth package in the set of packages; and
adding the fourth package to the subset of the available software packages.

14. A method according to claim 13, wherein adding the fourth package to the subset of the available software packages includes automatically adding the fourth package to the subset of the available software packages.

15. A method according to claim 10, further comprising remotely booting a destination for the customized installation, where the destination includes the machine of the user operative to boot responsive to receiving an instruction to boot the destination from the computer, the instruction not responsive to a communication from the destination.

16. A method according to claim 10, further comprising storing a backup copy of the customized installation.

17. A method according to claim 10, further comprising installing the customized installation.

18. A method according to claim 10, wherein accessing a set of available software packages includes accessing a set of Linux software packages.

19. An article, comprising:
a storage medium, said storage medium having stored thereon instructions, that, when executed by a machine, result in:
accessing a set of available software packages;
selecting a subset of the set of available software packages, the subset including least a first package and a second package and omitting a non-included package;
identifying that there is a conflict between the first package and the second package;
removing the first package from the subset of the available software packages;
selecting a third package that does not conflict with the second package at run-time;
adding the third package to the subset of the available software packages;
assembling the subset of available software packages into a customized installation, the customized installation to install the selected subset of the available software packages on a machine of the user;
notifying the user by a system generating the customized installation when an update to a package in the customized installation is available without the user checking whether the update exists, the update to the package in the customized installation becoming available after the user-customized installation was assembled; and
installing the update on the machine of the user after installing the customized installation on the machine of the user,
where the update to the package in the customized installation can become available either before or after installing the customized installation on the machine of the user.

20. An article according to claim 19, wherein the storage medium has further instructions stored thereon that, when executed by the machine result in:

identifying that the first package in the subset of the available software packages depends on a fourth package in the set of packages; and adding the fourth package to the subset of the available software packages.

21. An article according to claim 20, wherein adding the fourth package to the subset of the available software packages includes automatically adding the fourth package to the subset of the available software packages.

22. An article according to claim 19, wherein the storage medium has further instructions stored thereon that, when executed by the machine result in remotely booting a destination for the customized installation, where the destination includes the machine of the user operative to boot responsive to receiving an instruction to boot the destination from the computer, the instruction not responsive to a communication from the destination.

23. An article according to claim 19, wherein accessing a set of available software packages includes accessing a set of Linux software packages.

* * * * *

UNITED STATES PATENT AND TRADEMARK OFFICE
CERTIFICATE OF CORRECTION

PATENT NO.        : 8,074,214 B2
APPLICATION NO.   : 11/134541
DATED             : December 6, 2011
INVENTOR(S)       : Isaacson et al.

Page 1 of 1

It is certified that error appears in the above-identified patent and that said Letters Patent is hereby corrected as shown below:

On page 2, in column 2, under "Other Publications", line 28, delete "getouffoxed" and insert -- getoutfoxed --, therefor.

On page 3, in column 1, under "Other Publications", line 18, delete "38 Chapter" and insert -- Chapter --, therefor.

On page 3, in column 2, under "Other Publications", line 19, delete "Immunnology" and insert -- Immunology --, therefor.

On page 3, in column 2, under "Other Publications", line 33, delete "mismatchs" and insert -- mismatches --, therefor.

On page 3, in column 2, under "Other Publications", line 35, delete "Resuability" and insert -- Reusability --, therefor.

On page 3, in column 2, under "Other Publications", line 40, delete "AMC" and insert -- ACM --, therefor.

On sheet 4 of 11, in figure 4, line 1, delete "423" and insert -- 422 --, therefor.

In column 10, line 41, in Claim 1, delete "run time" and insert -- run-time --, therefor.

In column 11, line 41, in Claim 10, delete "least" and insert -- at least --, therefor.

In column 12, line 38, in Claim 19, delete "least" and insert -- at least --, therefor.

Signed and Sealed this
Sixth Day of March, 2012

David J. Kappos
*Director of the United States Patent and Trademark Office*